3,080,394
2-FORMYL-4-HALO-Δ²-ANDROSTENES
Albert Bowers, John Edwards, and James C. Orr, all of Mexico City, Mexico, assignors to Syntex Corporation, a corporation of Panama
No Drawing. Filed Sept. 29, 1961, Ser. No. 141,602
Claims priority, application Mexico Apr. 19, 1961
14 Claims. (Cl. 260—397.4)

The present invention relates to certain new cyclopentanophenanthrene derivatives and to a method for the preparation thereof.

More particularly, our invention relates to the novel 4α and 4β-halo, 4α-methyl and Δ⁴-dehydro derivatives of 2-formyl-Δ²-androsten-17β-ol, as well as to their 17α-alkyl, alkenyl and alkynyl substituted derivatives; it also comprises the preparation of the esters of such compounds and of their corresponding 19-nor analogs.

Such compounds are powerful anabolic agents which possess a favorable anabolic-androgenic ratio, stimulate the appetite, help to increase the protein metabolism and the deposition of calcium on the bone tissue, and further exhibit anti-estrogenic activity, lower the cholesterol level in the blood, inhibit the excretion of gonadotrophins by the pituitary gland and show a depressant action on the central nervous system.

The 17α-alkenyl and 17α-alkynyl compounds further possess progestational activity.

The novel compounds object of our invention are represented by the following formulas:

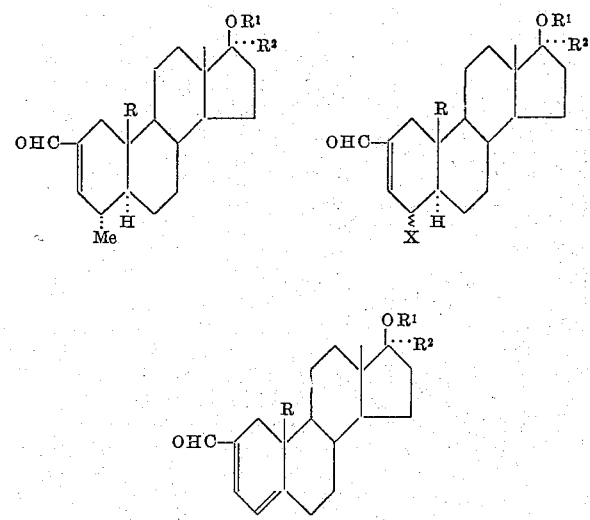

In the above formulas R represents hydrogen or methyl, $R^1$ represents hydrogen or an acyl group derived from a carboxylic acid of 1 to 12 carbon atoms; $R^2$ represents hydrogen or a lower aliphatic hydrocarbon group such as a lower alkyl, alkenyl or alkynyl group such as methyl, ethyl, propyl, vinyl, ethynyl or propynyl, and X represents a halogen atom such as fluorine, chlorine or bromine. The wavy line at C-4 indicates the α or β configuration for the halo substituent at such position.

The acyl groups are derived from carboxylic acids of less than 12 carbon atoms, saturated or unsaturated, of straight, branched, cyclic or mixed aliphatic-cyclic chain, substituted or not with hydroxyl, methoxy, amino, halogen or other groups; typical such esters are the acetate, propionate, butyrate, valerate, hemisuccinate, enanthate, trimethylacetate, phenoxyacetate, cyclopentylpropionate and β-chloropropionate.

The 4α-methyl-17β-hydroxy-Δ²-androstenes, as well as their corresponding 19-nor analogs are obtained by the method illustrated by the following series of reactions:

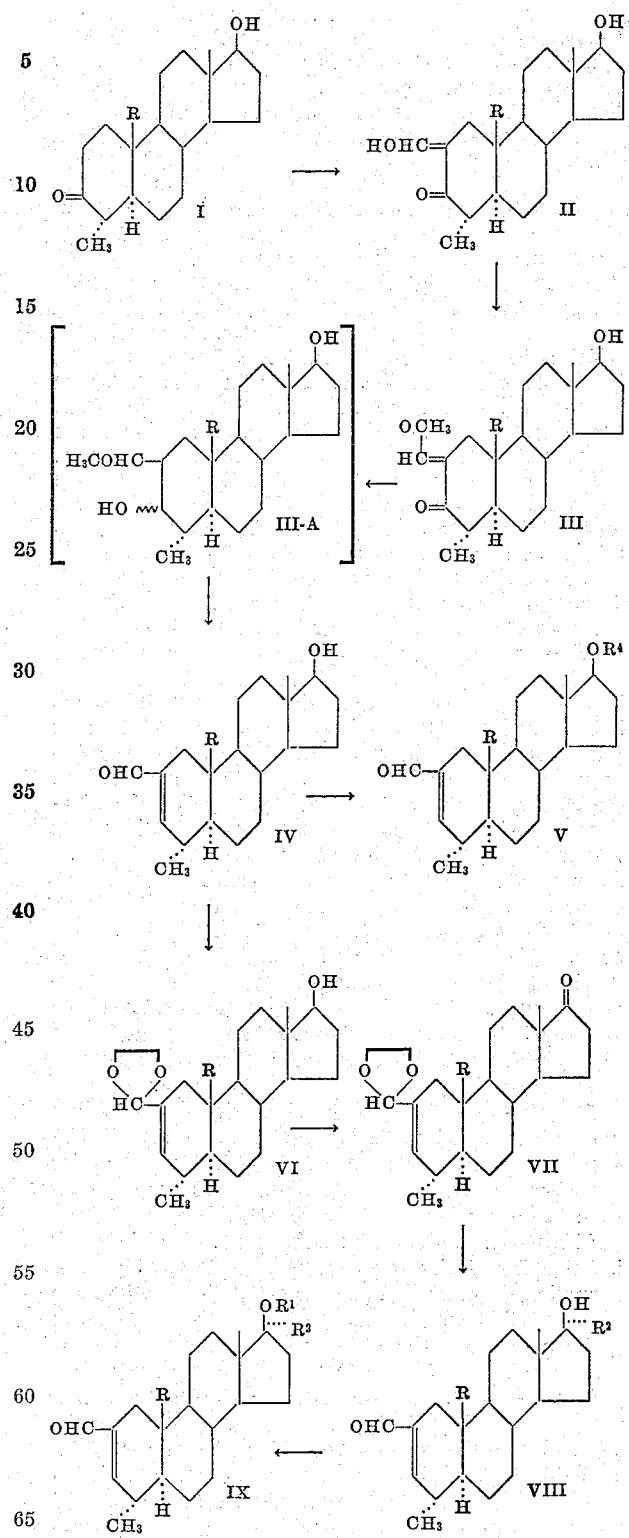

In the above formulas R, $R^1$ and $R^2$ have the same meaning indicated previously. $R^4$ represents the acyl group of a hydrocarbon carboxylic acid of the type mentioned previously.

The starting compounds 4α-methyl-androstan-17β-ol-3-one or the 19-nor derivative (I) (which is obtained from 5β,10β-estran-17β-ol-3-one by following the method described in U.S. Patent 2,844,602) are respectively converted into 2-hydroxymethylene-4α-methyl-androstan-17β-ol-3-one and 2-hydroxymethylene-4α-methyl-19-nor-androstan-17β-ol-3-one (II) by treatment with ethyl formate in the presence of sodium hydride, in accordance with the method described by H. J. Ringold et al., J. Am. Chem. Soc., 81, 427 (1959). By reacting the above 2-hydroxymethylene compounds with an excess of diazomethane, at room temperature for a prolonged period of time, or with methanol in the presence of perchloric acid, there are obtained the methoxymethylene compounds (III).

By reduction of 2-methoxymethylene-4α-methyl-androstan-17β-ol-3-one or of the 19-nor derivative with a double metal hydride, such as sodium borohydride, at room temperature and in an adequate solvent such as methanol, dioxane or tetrahydrofurane, for a period of time fluctuating between 30 minutes and 4 hours, there is obtained a mixture of 3α and 3β-hydroxy compounds (III-A), which is dehydrated by acid treatment, for example with hydrochloric acid, perchloric acid or sulfuric acid, with simultaneous transformation of the 2-methoxymethylene grouping into the respective aldehyde, thus giving rise to the formation of 2-formyl-4α-methyl-Δ²-androsten-17β-ol and of the 19-nor derivative (IV). By reacting these compounds with anhydrides or chlorides of acids of 1 to 12 carbon atoms, in pyridine solution, there are obtained the respective esters (V).

For obtaining the 17α-substituted compounds, 2-formyl-4α-methyl-Δ²-androsten-17β-ol-or the 19-nor derivative are converted into the respective ethyleneketals (VI), which on oxidation with chromic acid in pyridine produce the 17-ketones (VII). By further treatment of these ketones with an alkyl, alkenyl or alkynyl magnesium halide, such as methyl, ethyl, propyl, vinyl, ethynyl or propargyl magnesium bromide, followed by acid hydrolysis of the ethylenedioxy group there are obtained the corresponding 17α-alkyl, alkenyl or alkynyl derivatives of 2-formyl-4α-methyl-Δ²-androsten-17β-ol and of 2-formyl-4α-methyl-Δ²-19-nor-androsten-17β-ol (VIII).

By reacting these compounds with acid anhydrides or chlorides of 1 to 12 carbon atoms, in benzene solution and in the presence of p-toluenesulfonic acid, there are obtained the respective esters (IX).

Alternatively, the 2-formyl-4α-methyl-17α-alkyl compounds may be obtained by treating 2-ethylenedioxymethyl-4α-methyl-Δ²-androsten-17-one or the 19-nor derivative (VIII) with an alkyl-lithium, followed by acid treatment to hydrolyze the ketal.

The 17α-alkynyl substituted derivatives may also be obtained by reacting the ketones of Formula VII with sodium or potassium acetylide or with the sodium or potassium salt of another alkine, such as propine, followed by hydrolysis of the ketal.

Alternatively, the reaction sequence may be inverted, i.e., first introducing the substituent at C–17α by transformation of 4α-methyl-androstan-17β-ol-3-one into the 3-ethylenedioxy derivative, oxidizing the latter with chromic acid in pyridine to produce 3-ethylenedioxy-4α-methyl-androstan-17-one, treating this compound with a Grignard reagent, with an alkyl-lithium or with sodium acetylide, and hydrolyzing the ketal, thus obtaining the 17α-alkyl, 17α-alkenyl and 17α-alkynyl derivatives of 4α-methyl-androstan-17β-ol as well as the corresponding 19-nor derivatives. These compounds are then converted into the respective 2-hydroxymethylene and 2-methoxymethylene derivatives, which on reduction with sodium borohydride followed by acid treatment produce the 17α-alkyl, alkenyl or alkynyl derivatives of 2-formyl-4α-methyl-Δ²-androsten-17β-ol and of 2-formyl-4α-methyl-Δ²-19-nor-androsten-17β-ol.

The novel 4-halo-2-formyl-Δ²-androstenes object of our invention are obtained by the method illustrated by the following series of reactions:

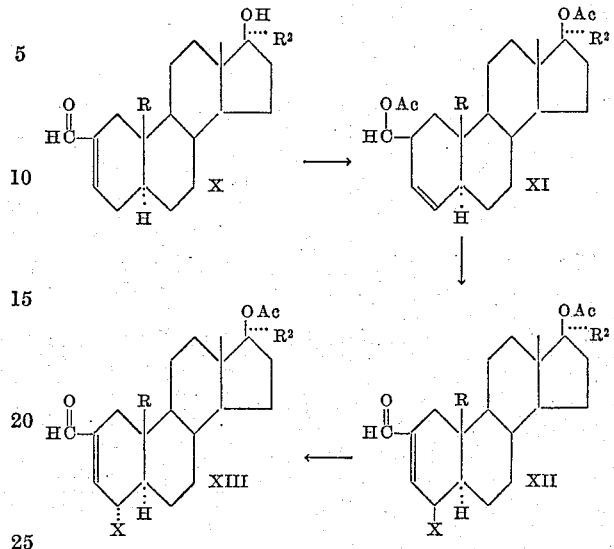

In the above formulas R and R² have the same meaning indicated previously; Ac represents the acetyl radical; X is halogen.

The starting compounds 2-formyl-Δ²-androsten-17β-ol, or the 17α-alkyl, alkenyl or alkynyl substituted derivatives, or the corresponding 19-nor derivatives (X), obtained in accordance with the method described in our copending patent application Serial No. 128,974, filed August 3, 1961, is treated with acetic anhydride in the presence of p-toluenesulfonic acid, at room temperature and for a period of time between 4 and 8 hours, or with acetic anhydride in the presence of perchloric acid, at room temperature for 1 to 2 hours, or by refluxing with a mixture of acetic anhydride, acetyl chloride and pyridine for 1 to 3 hours, to produce the enol acetates at C–2, with simultaneous acetylation of the 17β-hydroxyl group, i.e., the acetate of 2-acetoxymethylene-Δ³-androsten-17β-ol, its 17α-alkyl, alkenyl or alkynyl substituted derivatives, as well as the corresponding 19-nor derivatives (XI).

For introducing a chlorine atom at C–4, the enol acetates set forth above are treated with N-chlorosuccinimide in aqueous acetone solution and in the presence of sodium acetate and acetic acid, or in dioxane solution and in the presence of perchloric acid. Alternatively, there may be employed in this reaction other reagents capable of generating hypochlorous acid, such as an alkali or alkali metal hypochlorite or another N-chloroimide or N-chloroamide. In this manner there are obtained the acetate of 2-formyl-4β-chloro-Δ²-androsten-17β-ol, the acetate of 2-formyl-4β-chloro-Δ²-19-nor-androsten-17β-ol, as well as their 17α-substituted derivatives (XII: X=Cl). By acid treatment of the above compounds, preferably with dry hydrogen chloride in glacial acetic acid solution, or in acetone solution, there is inverted the steric configuration at C–4, thus producing the corresponding 4α-chloro-compounds (XIII: X=Cl).

In a similar manner, substituting the N-chlorosuccinimide by N-bromosuccinimide, or employing another reagent capable of generating hypobromous acid, there is obtained the acetate of 2-formyl-4β-bromo-Δ²-androsten-17β-ol and of its 19-nor derivative (XII: X=Br), which upon treatment with acid produce the 4α-bromo compounds (XIII: X=Br).

The 4-fluoro-2-formyl-Δ²-androstenes are obtained by reacting the enol acetates of formula XI with perchloryl fluoride in pyridine, dioxane or dimethylformamide solution, at a temperature between 0° and 20° C. Generally the reaction is effected in a few minutes, although it is preferred to allow it to proceed for a longer time. There are thus obtained the acetate of 2-formyl-4β-fluoro- $\Delta^2$-androsten-17β-ol, its 17α-alkyl, alkenyl or alkynyl substituted derivatives, as well as the corresponding 19-nor derivative (XII: X=F). Acid treatment of these compounds produces the 4α-fluoro compounds (XIII: X=F).

The 17β-hydroxy compounds are obtained by the method illustrated by the following series of reactions:

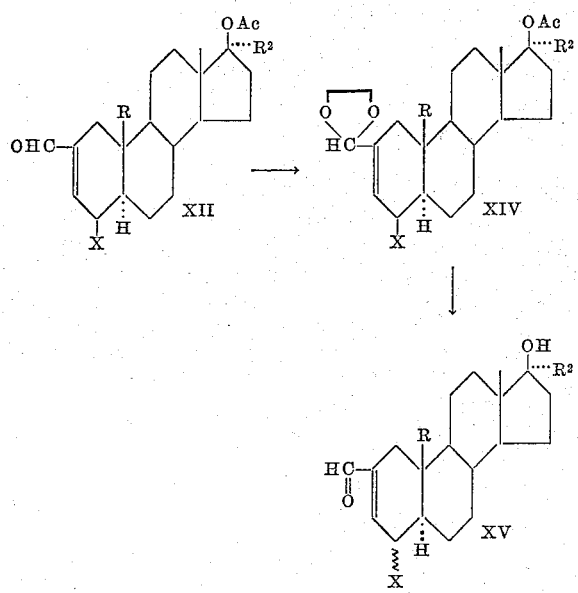

In the above formulas R, R², Ac and X have the same meaning set forth previously. The wavy line represents the α or β configuration for the 4-halo substituent.

The acetates of 2-formyl-4β-halo-$\Delta^2$-androsten-17β-ols, 2-formyl-4β-halo-19-nor-$\Delta^2$-androsten-17β-ols as well as their 17α-substituted derivatives (XII) were converted into the corresponding ketals (XIV). By treating these compounds with lithium aluminum hydride there was hydrolyzed the acetoxy group at C–17 and finally the formyl group at C–2 was regenerated by acid treatment, preferably with p-toluenesulfonic acid in acetone, to produce the 2-formyl-4β-halo compounds, or also with hydrogen chloride in ethyl acetate or acetic acid, with simultaneous inversion of the 4-halo substituent, thus obtaining 2-formyl-4α-halo-$\Delta^2$-androsten-17β-ol, 2-formyl-4α-halo-19-nor-$\Delta^2$-androsten-17β-ol and their 17α-alkyl, alkenyl and alkynyl substituted derivatives (XV).

By reacting these compounds with anhydrides or chlorides of hydrocarbon carboxylic acids of 1 to 12 carbon atoms, in accordance with the methods indicated previously, there are obtained the respective esters.

The $\Delta^4$-dehydro compounds, i.e., 2-formyl-$\Delta^{2,4}$-androstadien-17β-ol, 2-formyl-$\Delta^{2,4}$-19-nor-androstadien-17β-ol and their 17α-alkyl, alkenyl or alkynyl substituted derivatives, are obtained by dehydrobrominating with collidine the 4α and 4β bromo compounds, in accordance with the following equation:

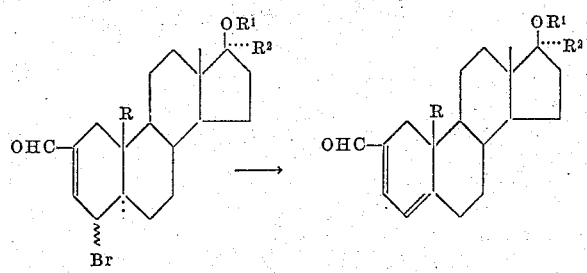

wherein R, R¹ and R² have the same meaning set forth previously. Alternatively, the dehydrobromination may be effected by refluxing with calcium carbonate in dimethylformamide or dimethylacetamide.

The following examples serve to illustrate but are not intended to limit the scope of the present invention:

Example I

To a solution of 10 g. of 4α-methyl-androstan-17β-ol in 100 cc. of thiophene free-benzene was added 4 cc. of ethyl formate and 3 g. of sodium hydride and the mixture was stirred for 8 hours under an atmosphere of nitrogen; at the end of this time there was collected by filtration the resulting sodium salt of the 2-hydroxymethylene derivative together with the excess of hydride; the precipitate was washed with benzene and dried under vacuum. The product was cautiously added to an ice cold solution of hydrochloric acid, thus affording 2-hydroxymethylene-4α-methyl-androstan-17β-ol, which was recrystallized from chloroform-methanol.

To a solution of 10 g. of the above compound in 50 cc. of methanol was added 5 drops of 70% perchloric acid and the mixture was stirred at room temperature for 10 minutes. A precipitate separated immediately, which was collected by filtration, thus yielding 2-methoxymethylene - 4α - methyl - androstan - 17β - ol - 3 - one, M.P. 216–18° C., $[\alpha]_D+45°$ (chloroform), λmax. 276 mμ, log E 4.08.

A solution of 4.5 g. of the above methoxymethylene derivative in 150 cc. of methanol was treated with 2.25 g. of sodium borohydride previously dissolved in 5 cc. of water and 10 cc. of methanol; the mixture was kept standing at room temperature for 1 hour, treated with 1.5 cc. of concentrated hydrochloric acid (until acid reaction) and the mixture was kept at room temperature for 10 minutes further, then poured into water and the precipitate was collected; crystallization from ethyl acetate afforded 2-formyl-4α-methyl-$\Delta^2$-androsten-17β-ol, M.P. 196–203° C.; $[\alpha]_D+19°$ (dioxane), λmax. 234 mμ, log E 4.06.

Example II

A mixture of 1 g. of 2-formyl-4α-methyl-$\Delta^2$-androsten-17β-ol, 5 cc. of pyridine and 2 cc. of acetic anhydride was kept overnight at room temperature, then poured into water and the precipitate formed was collected, thus affording the acetate of 2-formyl-4α-methyl-$\Delta^2$-androsten-17α-ol.

In the same manner, but using propionic, caproic and cyclopentylpropionic anhydrides as esterifying agents, there were obtained the propionate, the caproate and the cyclopentylpropionate of 2-formyl-4α-methyl-$\Delta^2$-androsten-17β-ol.

Example III

A mixture of 5 g. of 2-formyl-4α-methyl-$\Delta^2$-androsten-17β-ol, 300 cc. of anhydrous benzene, 35 cc. of ethylene glycol and 1 g. of p-toluenesulfonic acid monohydrate was refluxed for 8 hours, removing the water formed during the reaction by means of a water separator; the cooled solution was washed with 5% sodium carbonate solution and then with water to neutral, dried over anhydrous sodium sulfate and evaporated to dryness. Chromatography of the residue on neutral alumina furnished the ethyleneketal of 2-formyl-4α-methyl-$\Delta^2$-androsten-17β-ol.

A solution of 2 g. of the above compound in 20 cc. of pyridine was treated with 1 g. of chromium trioxide in 40 cc. of pyridine at room temperature for 16 hours. The mixture was then diluted with ethyl acetate, filtered and the filtrate was washed with water to remove the pyridine, dried over anhydrous sodium sulfate and the solvent was evaporated. Crystallization of the residue from acetone-hexane afforded the 2-ethyleneketal of 2-formyl-4α-methyl-$\Delta^2$-androsten-17-one.

Example IV

A solution of 1 g. of the above ketone in 40 cc. of anhydrous benzene free of thiophene was slowly added to 5 cc. of a 4 N solution of methyl magnesium bromide in ether and the mixture was refluxed under anhydrous conditions for 3 hours, cooled and cautiously poured into water, acidified with hydrochloric acid and stirred for 3 hours at room temperature; the benzene layer was separated, the aqueous phase was extracted several times with ethyl acetate, these extracts were combined with the benzene solution and the organic solution was washed to neutral, dried over anhydrous sodium sulfate and evaporated to dryness under reduced pressure. Crystallization from acetone-hexane afforded 2-formyl-4α,17α-dimethyl-Δ²-androsten-17β-ol.

A mixture of 1 g. of the above compound, 40 cc. of acetic acid, 20 cc. of acetic anhydride and 1 g. of p-toluenesulfonic acid was kept at room temperature for 16 hours, poured into water, heated for 30 minutes on the steam bath to hydrolyze the excess of reagent and extracted with ethyl acetate. The organic extract was washed to neutral, dried and evaporated to dryness. The residue was dissolved in 50 cc. of 0.5% methanolic potassium hydroxide solution, kept for 1 hour at room temperature, diluted with water and extracted with ethyl acetate; the extract was washed to neutral, dried and evaporated to dryness. The residue was crystallized from acetone-hexane, thus yielding the acetate of 2-formyl-4α,17α-dimethyl-Δ²-androsten-17β-ol.

*Example V*

By following the method of the preceding example, but using ethyl magnesium bromide and vinyl magnesium bromide instead of methyl magnesium bromide as alkylating agents, the 2-ethyleneketal of 2-formyl-4α-methyl-Δ²-androsten-17-one was respectively converted into 2-formyl-4α-methyl-17α-ethyl-Δ²-androsten-17β-ol and 2-formyl-4α-methl-17α-vinyl-Δ²-androsten-17β-ol. By subsequent treatment of these compounds with a mixture of acetic acid and acetic anhydride in the presence of p-toluenesulfonic acid, followed by mild alkaline treatment, there were obtained the corresponding acetates.

*Example VI*

A solution of 5 g. of the 2-ethyleneketal of 2-formyl-4α-methyl-Δ²-androsten-17-one in 100 cc. of anhydrous ether was added dropwise to a solution of propargyl bromide, 1.4 g. of magnesium and 200 cc. of ether. The mixture was refluxed under continuous stirring overnight, cooled, poured into 500 cc. of 5% ammonium chloride solution and the ether layer was separated, washed to neutral with water, dried over anhydrous sodium sulfate and evaporated to dryness under vacuum. The residue was dissolved in 50 cc. of acetone, treated with 500 mg. of p-toluenesulfonic acid and kept overnight at room temperature; the mixture was then poured into ice water, extracted with ethyl acetate and the extract was washed to neutral, dried and evaporated to dryness under vacuum. By chromatography of the residue there was obtained 2-formyl-4α-methyl-17α-propargyl-Δ²-androsten-17β-ol.

1 g. of the above compound was dissolved in 20 cc. of benzene, treated with 2 cc. of propionic anhydride and 0.5 cc. of p-toluenesulfonic acid and kept overnight at room temperature. The mixture was then diluted with water, stirred for 30 minutes to hydrolyze the excess of reagent and the benzene layer was separated, washed with 5% sodium carbonate solution and with water to neutral, dried over anhydrous sodium sulfate and evaporated to dryness under vacuum. The residue was treated with 0.5% methanolic potassium hydroxide solution, in accordance with the method described in Example IV, thus yielding the propionate of 2-formyl-4α-methyl-17α-propargyl-Δ²-androsten-17β-ol.

*Example VII*

There was repeated the method of Example I, but using as starting material 4α-methyl-19-nor-androstan-17β-ol-3-one, thus affording successively 2-hydroxymethylene-4α-methyl-19-nor-androstan-17β-ol-3-one, 2-methoxymethylene-4α-methyl-19-nor-androstan-17β-ol-3-one and 2-formyl-4α-methyl-Δ²-19-nor-androsten-17β-ol.

A mixture of 500 mg. of 2-formyl-4α-methyl-Δ²-19-nor-androsten-17β-ol, 2 cc. of pyridine and 1 cc. of benzoyl chloride was heated on the steam bath for 1 hour, poured into water and the precipitate formed was collected by filtration, thus furnishing the benzoate of 2-formyl-4α-methyl-Δ²-19-nor-androsten-17β-ol.

The starting compound, 4α-methyl-19-nor-androstan-17β-ol-3-one was obtained from 5β,10β-estrane-17β-ol-3-one, described by R. Rapala et al. in J. Am. Chem. Soc., 80, 1008 (1958), by following the method described in U.S. Patent No. 2,844,602.

*Example VIII*

By following the method of Example III, 2 g. of 2-formyl-4α-methyl-Δ²-19-nor-androsten-17β-ol was converted into the corresponding ketal, which was oxidized with chromium trioxide in pyridine to produce the 2-ethyleneketal of 2-formyl-4α-methyl-Δ²-19-nor-androsten-17-one.

The above compound was treated with methyl magnesium bromide followed by acid treatment, in accordance with the method described in Example IV, thus obtaining 2-formyl-4α,17α-dimethyl-Δ²-19-nor-androsten-17β-ol.

*Example IX*

A solution of 2 g. of the 2-ethyleneketal of 2-formyl-4α-methyl-Δ²-androsten-17-one in 60 cc. of anhydrous benzene was added under an atmosphere of nitrogen to a solution of potassium ter-amyloxide previously prepared from 1.4 g. of potassium and 30 cc. of ter-amyl alcohol. Into the resulting mixture there was introduced a slow stream of purified acetylene for 40 hours and the solution was then poured into ice water and extracted with several portions of benzene. The combined organic extract was washed to neutral, dried over anhydrous sodium sulfate and evaporated to dryness under vacuum. The residue was hydrolyzed with p-toluenesulfonic acid in acetone, in accordance with the method of Example VI, thus giving 2-formyl-4α-methyl-17α-ethynyl-Δ²-androsten-17β-ol.

A mixture of 500 mg. of the above compound, 25 cc. of benzene, 2 cc. of cyclopentylpropionic anhydride and 250 mg. of p-toluenesulfonic acid was kept at room temperature for 48 hours, diluted with water and stirred for 30 minutes to hydrolyze the excess of reagent. The benzene layer was separated, washed to neutral, dried over anhydrous sodium sulfate and evaporated to dryness. The residue was treated with 0.5% methanolic potassium hydroxide solution, in accordance with the method described in Example IV. By crystallization from acetone-ether there was obtained the cyclopentylpropionate of 2-formyl-4α-methyl-17α-ethynyl-Δ²-androsten-17β-ol.

In the same manner, 1 g. of the ketal of 2-formyl-4α-methyl-Δ²-19-nor-androsten-17-one was converted into 2-formyl-4α-methyl-17α-ethynyl-Δ²-19-nor-androsten-17β-ol, which on esterification with caproic anhydride in benzene solution and in the presence of p-toluenesulfonic acid produced the caproate of 2-formyl-4α-methyl-17α-ethynyl-Δ²-19-nor-androsten-17β-ol.

*Example X*

A mixture of 5 g. of 2-formyl-Δ²-androsten-17β-ol, obtained as described in our patent application Serial No. 128,974, filed on August 3, 1961, 50 cc. of acetic anhydride, 20.5 cc. of acetyl chloride and 225 cc. of pyridine was refluxed for 1½ hours under an atmosphere of nitrogen and then the solvents were evaporated under reduced pressure; the residue was dissolved in ethyl acetate, washed to neutral, dried over anhydrous sodium sulfate and evaporated until crystallization started. There was thus obtained the acetate of 2-acetoxymethylene-Δ³-androsten-17β-ol, M.P. 113–116° C., [α]$_D$+41° (chloroform); λmax. 248 mμ, log E 4.15.

A solution of 2 g. of the above enol acetate in 40 cc. of dioxane was cooled to 10° C., treated with 3 cc. of 0.5 N perchloric acid and 1 g. of N-chlorosuccinimide in portions and over a period of 30 minutes. The mixture was stirred for 2 hours further at room temperature, poured into water and extracted with ethyl acetate. By crystallization from acetone-ether there was obtained the acetate of 2-formyl-4β-chloro-Δ²-androsten-17β-ol.

Example XI

To a solution of 2 g. of the acetate of 2-acetoxymethylene-Δ³-androsten-17β-ol in 30 c. of pyridine was introduced a stream of perchloryl fluoride for 5 hours at 0–5° C.; at the end of this time the mixture was poured into ice water and extracted with ethyl acetate; the organic extract was washed to neutral, dried over anhydrous sodium sulfate and evaporated to dryness. Crystallization of the residue from acetone-ether afforded the acetate of 2-formyl-4β-fluoro-Δ²-androsten-17β-ol.

A solution of 1.5 g. of the above compound in 50 cc. of acetone was treated with 10 drops of 70% perchloric acid and the mixture was kept standing overnight at room temperature, then diluted with water and extracted with methylene chloride; the extract was washed with water to neutral, dried and evaporated to dryness. By chromatography of the residue there was obtained the acetate of 2-formyl-4α-fluoro-Δ²-androsten-17β-ol.

Example XII

There was repeated the method of Example X, but using as starting compounds 2-formyl-17α-methyl-Δ²-androsten-17β-ol and 2-formyl-17α-methyl-Δ²-19-nor-androsten-17β-ol, described in our patent application Serial No. 128,974; there were thus obtained as final products the acetate of 2-formyl-4β-chloro-17α-methyl-Δ²-androsten-17β-ol and the acetate of 2-formyl-4β-chloro-17α-methyl-Δ²-19-nor-androsten-17β-ol.

Example XIII 2 g. of 2-formyl-17α-ethinyl-Δ²-androsten-17β-ol was treated with acetic anhydride, acetyl chloride and pyridine, following the method described in Example X, thus giving the acetate of 2-acetoxymethylene-17α-ethinyl-Δ³-androsten-17β-ol, which was converted into the acetate of 2-formyl-4β-chloro-17α-ethinyl-Δ²-androsten-17β-ol by treatment with N-chlorosuccinimide.

A mixture of 1 g. of the above compound, 60 cc. of benzene free of thiophene, 7 cc. of ethyleneglycol and 0.2 g. of p-toluenesulfonic acid was refluxed for 8 hours using a water separator; at the end of this time the resulting solution was washed with 10% sodium carbonate solution and with water to neutral, dried over anhydrous sodium sulfate and evaporated to dryness under vacuum. The residue was crystallized from acetone-ether, thus affording the ethyleneketal of the acetate of 2-formyl-4β-chloro-17α-ethinyl-Δ²-androsten-17β-ol.

A solution of 800 mg. of the above compound in 20 cc. of anhydrous tetrahydrofurane was added dropwise to 400 mg. of lithium aluminum hydride in 40 cc. of tetrahydrofurane and the mixture was refluxed under anhydrous conditions for 30 minutes. After cooling the excess of reagent was destroyed by the cautious addition of a few drops of ethyl acetate, then 20 cc. of saturated aqueous sodium sulfate solution was added, followed by anhydrous sodium sulfate; the solids were removed by filtration and the solution was evaporated to dryness under reduced pressure, thus yielding the ethyleneketal of 2-formyl-4β-chloro-17α-ethinyl-Δ²-androsten-17β-ol.

The above crude product was dissolved in 20 cc. of acetone, treated with 50 mg. of p-toluenesulfonic acid and the mixture was kept at room temperature for 6 hours; water was then added, the product was extracted with methylene chloride and the organic extract was washed to neutral, dried over anhydrous sodium sulfate and evaporated to dryness. Crystallization from acetone-hexane furnished 2-formyl-4β-chloro-17α-ethinyl-Δ²-androsten-17β-ol.

The above compound was esterified with propionic anhydride in benzene solution and in the presence of p-toluenesulfonic acid, following the method described in Example VI, to produce the propionate of 2-formyl-4β-chloro-17α-ethinyl-Δ²-androsten-17β-ol.

Example XIV

By following the method described in the preceding example, the acetate of 2-formyl-4β-chloro-Δ²-androsten-17β-ol, obtained in Example X, was converted into the corresponding ethyleneketal and then saponified with lithium aluminum hydride to give the ethyleneketal of 2-formyl-4β-chloro-Δ²-androsten-17β-ol. A mixture of 500 mg. of this compound and 20 cc. of ethyl acetate saturated with dry hydrogen chloride was kept standing at room temperature for 5 hours; at the end of this time it was washed to neutral, dried over anhydrous sodium sulfate and evaporated to dryness under vacuum. Under these conditions there was hydrolyzed the ketal with simultaneous inversion of the 4β-chloro substituent, thus producing finally 2-formly-4α-chloro-Δ²-androsten-17β-ol.

The above compound was esterified with benzoyl chloride in pyridine, by following the method of Example VII, to give the benzoate of 2-formyl-4α-chloro-Δ²-androsten-17β-ol.

Example XV 2 g. of 2-formyl-17α-methyl-Δ²-androsten-17β-ol was converted into the acetate of 2-acetoxymethylene-17α-methyl-Δ³-androsten-17β-ol by treatment with acetic anhydride, acetyl chloride and pyridine, in accordance with the method of Example X.

A solution of 1.5 g. of the above compound in 20 cc. of pyridine was cooled to 0–5° C. and a stream of perchloryl fluoride was introduced into the solution for 5 hours; at the end of this time the mixture was poured into ice water, extracted with methylene chloride and the extract was washed to neutral, dried over anhydrous sodium sulfate and evaporated to dryness. Crystallization of the residue from acetone-hexane afforded the acetate of 2-formyl-4β-fluoro-17α-methyl-Δ²-androsten-17β-ol.

The above compound was converted into the corresponding ethyleneketal, which was then saponified with lithium aluminum hydride to produce the ethyleneketal of 2-formyl-4β-fluoro-17α-methyl-Δ²-androsten-17β-ol; the latter was then hydrolyzed with p-toluenesulfonic acid in acetone, by following the method of Example XIII, thus obtaining finally 2-formyl-4β-fluoro-17α-methyl-Δ²-androsten-17β-ol.

Example XVI

There was repeated the method of the preceding example, but using as starting compound 2-formyl-17α-vinyl-Δ²-androsten-17β-ol, thus giving rise to the sucessive formation of the acetate of 2-acetoxymethylene-17α-vinyl-Δ³-androsten-17β-ol, the acetate of 2-formyl-4β-fluoro-17α-vinyl-Δ²-androsten-17β-ol, the acetate of 2-ethylenedioxymethyl-4β-fluoro-17α-vinyl-Δ²-androsten-17β-ol, 2-ethylenedioxymethyl-4β-fluoro-17α-vinyl-Δ²-androsten-17β-ol and 2-formyl-4β-fluoro-17α-vinyl-Δ²-androsten-17β-ol; by treating the latter with caproic anhydride in benzene solution and in the presence of p-toluenesulfonic acid there was obtained the caproate of 2-formyl-4β-fluoro-17α-vinyl-Δ²-androsten-17β-ol.

Example XVII

A mixture of 1 g. of the acetate of 2-acetoxymethylene-Δ³-androsten-17β-ol, 20 cc. of acetone, 400 mg. of anhydrous sodium acetate and 6.6 cc. of water was cooled to 0–5° C. and then treated with 510 mg. of N-bromosuccinimide (1.1 molecular equivalents) and 0.4 cc. of acetic acid. The mixture was stirred at 0–5° C. for 30 minutes, diluted with water and the precipitate formed was collected by filtration, washed with water and recrystallized from acetone. There was thus obtained the acetate of 2-formyl-4b-bromo-Δ²-androsten-17β-ol, M.P. 179–183° C., [α]$_D$—32° (chloroform) λmax. 236–238 mμ, log E 4.11.

The above compound was converted into the corresponding ethyleneketal, saponified with lithium aluminum hydride and finally the ketal was hydrolyzed with p-toluenesulfonic acid in acetone, in accordance with the method described in Example XIII, to give 2-formyl-4β-bromo-Δ²-androsten-17β-ol.

*Example XVIII*

2 g. of the acetate of 2-acetoxymethylene-17α-methyl-Δ³-19-nor-androsten-17β-ol, intermediate in Example XII, was treated with N-bromosuccinimide, by following the method of the preceding example, thus producing the acetate of 2-formyl-4b-bromo-17α-methyl-19-nor-Δ²-androsten-17β-ol.

To a solution of 1.2 g. of the above compound in 25 cc. of ethyl acetate was introduced a slow stream of dry hydrogen chloride for 1 hour, then kept standing overnight at room temperature, treated with water, the organic layer was separated and washed to neutral, dried over anhydrous sodium sulfate and evaporated to dryness under vacuum. Crystallization of the residue from acetone-hexane afforded the acetate of 2-formyl-4α-bromo-17α-methyl-Δ²-19-nor-androsten-17β-ol.

*Example XIX*

By following the method of Example X, 2 g. of 2-formyl-Δ²-19-nor-androsten-17β-ol was converted into the acetate of 2-acetoxymethylene-Δ³-19-nor-androsten-17β-ol, which upon reaction with perchloryl fluoride followed by acid treatment, in accordance with the method described in Example XIV, produced the acetate of 4α-fluoro-2-formyl-Δ²-19-nor-androsten-17β-ol.

500 mg. of the above compound was hydrolyzed with lithium aluminum hydride, previous protection of the 2-formyl group by formation of the ethyleneketal, thus obtaining 2-formyl-4α-fluoro-Δ²-19-nor-androsten-17β-ol.

By esterifying this compound with propionic, caproic or undecenoic anhydrides in pyridine solution there were obtained the respective esters.

*Example XX*

By following the method described in Example X, 5 g. of 2-formyl-17α-vinyl-Δ²-androsten-17β-ol was converted into the acetate of 2-acetoxy methylene-17α-vinyl-Δ³-androsten-17β-ol.

The above compound was treated with 1.1 molar equivalents of N-chlorosuccinimide in the presence of sodium acetate and acetic acid, in accordance with the method of Example XVII, to produce the acetate of 2-formyl-4β-chloro-17α-vinyl-Δ²-androsten-17β-ol. By then following the method described in Example XIII, the above compound was converted into the corresponding ethyleneketal, which upon treatment with lithium aluminum hydride gave the ethyleneketal of 2-formyl-4β-chloro-17α-vinyl-Δ²-androsten-17β-ol. By treatment with p-toluenesulfonic acid in acetone there was obtained 2-formyl-4β-chloro-17α-vinyl-Δ²-androsten-17β-ol.

*Example XXI*

In accordance with the method of hydrolysis described in Example XIV, 1.75 g. of the ethyleneketal of 2-formyl-4β-chloro-17α-vinyl-Δ²-androsten-17β-ol, intermediate in the preceding example, was treated with hydrogen chloride in ethyl acetate to produce 2-formyl-4α-chloro-17α-vinyl-Δ²-androsten-17β-ol.

The above compound was esterified with caproic anhydride in benzene solution and in the presence of p-toluenesulfonic acid, followed by alkaline treatment, in accordance with the method of Example VI, to give the caproate of 2-formyl-4α-chloro-17α-vinyl-Δ²-androsten-17β-ol.

*Example XXII*

500 mg. of the ethyleneketal of 2-formyl-4β-chloro-17α-ethynyl-Δ²-androsten-17β-ol, intermediate in Example XIII, was dissolved in 15 cc. of ethyl acetate and into the solution there was introduced a slow stream of dry hydrogen chloride for 1 hour, kept for 5 hours and then diluted with water; the organic layer was separated, washed to neutral, dried and evaporated to dryness under vacuum. Crystallization from acetone-hexane yielded 2-formyl-4α-chloro-17α-ethynyl-Δ²-androsten-17β-ol.

In the same manner 2-formyl-4β-chloro-17α-vinyl-Δ²-androsten-17β-ol and 2-formyl-4β-fluoro-17α-vinyl-Δ²-androsten-17β-ol were respectively converted into 2-formyl-4α-chloro-17α-vinyl-Δ²-androsten-17β-ol and 2-formyl-4α-fluoro-17α-vinyl-Δ²-androsten-17β-ol.

*Example XXIII*

To suspension of 500 mg. of the acetate of 2-formyl-4β-chloro-17α-ethynyl-Δ²-androsten-17β-ol in 20 cc. of acetic acid was introduced a slow stream of dry hydrogen chloride for 4 hours and then water was added and the precipitate formed was collected. By crystallization from acetone-ether there was obtained the acetate of 2-formyl-4α-chloro-17α-ethynyl-Δ²-androsten-17β-ol.

*Example XXIV*

A mixture of 1 g. of the acetate of 2-formyl-4β-bromo-Δ²-androsten-17β-ol in 5 cc. of γ-collidine was refluxed under anhydrous conditions for 30 minutes, then diluted with ice water and extracted with ethyl acetate; the organic extract was washed with 5% hydrochloric acid solution to remove the collidine and with water to neutral, dried over anhydrous sodium sulfate and evaporated to dryness. The residue was chromatographed on 50 g. of washed alumina, thus giving 2-formyl-Δ²,⁴-androstadien-17β-ol-acetate.

500 mg. of the above compound was hydrolyzed with lithium aluminum hydride, previous protection of the 2-formyl group by formation of the ethyleneketal, thus giving 2-formyl-Δ²,⁴-androstadien-17β-ol.

By esterifying this compound with propionic, valeric and cyclopentylpropionic anhydrides there were obtained the respective esters.

*Example XXV*

By following the method described in Example XVII, 5 g. of the acetate of 2-acetoxymethylene-17α-methyl-Δ³-androsten-17β-ol, intermediate in Example XII, was treated with N-bromosuccinimide to form the acetate of 2-formyl-4β-bromo-17α-methyl-Δ²-androsten-17β-ol.

A solution of 3.5 g. of the above compound in 15 cc. of dimethylacetamide was added to a suspension of 1.75 g. of calcium carbonate in 35 cc. of dimethylacetamide, which had been previously heated to boiling. The resulting mixture was refluxed for 15 minutes with vigorous stirring, cooled, poured into dilute hydrochloric acid solution, extracted with methylene chloride and the extract was washed to neutral, dried and evaporated to dryness. Crystallization from ether afforded the acetate of 2-formyl-17α-methyl-Δ²,⁴-androstadien-17β-ol.

The above compound was converted into the corresponding ethyleneketal, saponified with lithium aluminum hydride and the ketal was then hydrolyzed by acid treatment, thus giving 2-formyl-17α-methyl-Δ²,⁴-androstadien-17β-ol.

By esterification with cyclopentylpropionic anhydride in benzene solution and in the presence of p-toluenesulfonic acid, followed by alkaline treatment, in accordance with the method described in Example VI, there was obtained the cyclopentylpropionate of 2 - formyl-17α-methyl-Δ²,⁴-androstadien-17β-ol.

*Example XXVI*

In accordance with the method described in the preceding example, 750 mg. of the acetate of 2-formyl-4α-bromo-17α-methyl-Δ²-19-nor-androsten-17β-ol, obtained in Example XVIII, was dehydrobrominated with calcium carbonate in dimethylacetamide, thus giving the acetate of 2-formyl-17α-methyl-Δ²,⁴-19-nor-androstadien-17β-ol.

*Example XXVII*

5 g. of the acetate of 2-acetoxymethylene-17α-ethynyl-Δ³-androsten-17β-ol, intermediate in Example XIII, was treated with N-bromosuccinimide in accordance with the method of Example XVII, thus giving the acetate of 2-formyl-4β-bromo-17α-ethynyl-Δ²-androsten-17β-ol.

A mixture of 2.25 g. of the above compound, 40 cc. of dimethylformamide and 1.15 g. of calcium carbonate was refluxed for 30 minutes under anhydrous conditions, poured into aqueous acid solution and extracted with ethyl acetate; the organic extract was washed to neutral, dried and evaporated to dryness. Crystallization from acetone-ether yielded the acetate of 2-formyl-17α-ethynyl-Δ²,⁴-androstadien-17β-ol.

In the same manner the acetate of 2-acetoxymethylene-17α-vinyl-Δ³-androsten-17β-ol, intermediate in Example XVI, was converted into the acetate of 2-formyl-4β-bromo-17α-vinyl-Δ²-androsten-17β-ol and then into the acetate of 2-formyl-17α-vinyl-Δ²,⁴-androstadien-17β-ol.

*Example XXVIII*

By following the method described in Example XIII, 1 g. of the acetate of 2-formyl-17α-ethynyl-Δ²,⁴-androstadien-17β-ol was converted into the corresponding ethyleneketal, which upon treatment with lithium aluminum hydride produced the ethyleneketal of 2-formyl-17α-ethynyl-Δ²,⁴-androstadien-17β-ol; hydrolysis of the latter with p-toluenesulfonic acid in acetone afforded 2-formyl-17α-ethynyl-Δ²,⁴-androstadien-17β-ol.

By esterifying this compound with propionic and caproic anhydrides in benzene solution and in the presence of p-toluenesulfonic acid in accordance with the method of Example VI, there was obtained the propionate and the caproate of 2-formyl-17α-ethynyl-Δ²,⁴-androstadien-17β-ol.

We claim:
1. A compound of the following formula:

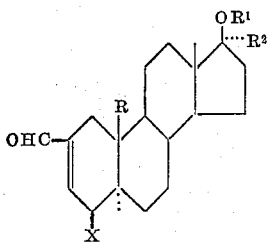

wherein X is selected from the group consisting of chlorine, bromine and fluorine; R is selected from the group consisting of hydrogen and methyl; $R^1$ is selected from the group consisting of hydrogen and a hydrocarbon carboxylic acyl group of less than 12 carbon atoms and $R^2$ is selected from the group consisting of hydrogen, lower alkyl, lower alkenyl and lower alkynyl.

2. 2-formyl-4β-chloro-Δ²-androsten-17β-ol.
3. 2-formyl-4β-bromo-Δ²-androsten-17β-ol-17 acetate.
4. 2-formyl-4β-chloro-17α-ethynyl-Δ²-androsten-17β-ol.
5. 2-formyl-4β-fluoro-17α-methyl-Δ²-androsten-17β-ol.
6. A compound of the following formula:

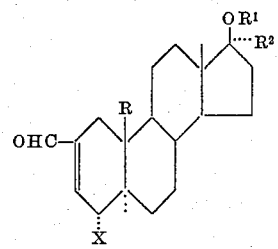

wherein X is selected from the group consisting of chlorine, bromine and fluorine; R is selected from the group consisting of hydrogen and methyl; $R^1$ is selected from the group consisting of hydrogen and a hydrocarbon carboxylic acyl group of less than 12 carbon atoms and $R^2$ is selected from the group consisting of hydrogen, lower alkyl, lower alkenyl and lower alkynyl.

7. 2-formyl-4α-chloro-Δ²-androsten-17β-ol.
8. 2-formyl-4α-fluoro-17α-vinyl-Δ²-androsten-17β-ol.
9. 2-formyl-4α-chloro-17α-ethynyl-Δ²-androsten-17β-ol.
10. 2-formyl-4α-bromo-17α-methyl-Δ²-19-nor-androsten-17β-ol.
11. 2-formyl-4α-chloro-17α-vinyl-Δ²-androsten-17β-ol.
12. A compound of the following formula:

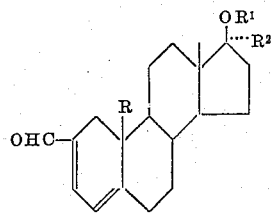

wherein R is selected from the group consisting of hydrogen and methyl; $R^1$ is selected from the group consisting of hydrogen and a hydrocarbon carboxylic acyl group of less than 12 carbon atoms and $R^2$ is selected from the group consisting of hydrogen, lower alkyl, lower alkenyl and lower alkynyl.

13. 2-formyl-Δ²,⁴-androstadien-17β-ol.
14. The 17α-lower aliphatic hydrocarbon derivative of 2-formyl-Δ²,⁴-androstadien-17β-ol.

No references cited.

UNITED STATES PATENT OFFICE
CERTIFICATE OF CORRECTION

Patent No. 3,080,394                          March 5, 1963

Albert Bowers et al.

It is hereby certified that error appears in the above numbered patent requiring correction and that the said Letters Patent should read as corrected below.

Column 2, lines 15 to 25, formula III A, should appear as shown below instead of as in the patent:

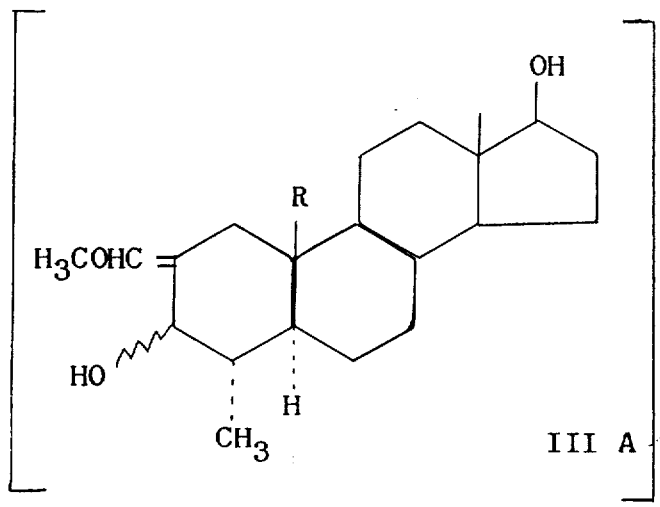

Signed and sealed this 8th day of October 1963.

(SEAL)
Attest:

ERNEST W. SWIDER                         EDWIN L. REYNOLDS
                                                    Acting Commissioner of
Attesting Officer                             Patents